July 22, 1941. H. J. MOON ET AL 2,250,029
COOKING APPLIANCE
Filed Sept. 26, 1940

Inventors
Herbert J. Moon
Emmet G. Gardner

Patented July 22, 1941

2,250,029

UNITED STATES PATENT OFFICE 2,250,029

COOKING APPLIANCE

Herbert J. Moon, St. Louis, Mo., and Emmet G. Gardner, Milwaukee, Wis., assignors to National Enameling & Stamping Company, Milwaukee, Wis., a corporation of New Jersey Application September 26, 1940, Serial No. 358,436

2 Claims. (Cl. 219—35)

This invention relates to cooking appliances, and refers particularly to so called electric roasters.

Cooking appliances of this type consist of an open topped receptacle having insulated walls within which electric heating elements are embedded to provide the heat source for the appliance. The open top of the receptacle is closed by an appropriate cover.

Originally cooking appliances or roasters of this type merely were provided with a switch to turn the unit on or off by connecting it with or disconnecting it from a source of electric current. As their development progressed, refinements such as thermostatic heat regulators were added.

Thought was also given to the incorporation of a timer or control similar to that employed in electric ranges for turning the roaster on at a given time and turning it off at a later predetermined time. But these controls of necessity include clock mechanism which cannot withstand excessively high temperatures; and as it is desirable to mount any control used on the front of the roaster where it is readily accessible and at all times directly visible, the relatively high ambient temperature directly adjacent to the walls of the roaster receptacle contstituted a problem which heretofore prevented the use of such controls on roasters of this type.

It is, therefore, an object of this invention to provide an electric roaster in which a timer or control is incorporated in such a manner that its clock mechanism, while on the front wall of the roaster, is adequately protected from the effects of excessive heating.

It is also an object of this invention to not only mount the control mechanism in a manner substantially insulated from the excessively hot wall of the roaster receptacle, but also in a manner which lends beauty to the roaster and blends in with its finish and design.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which.

Figure 1:
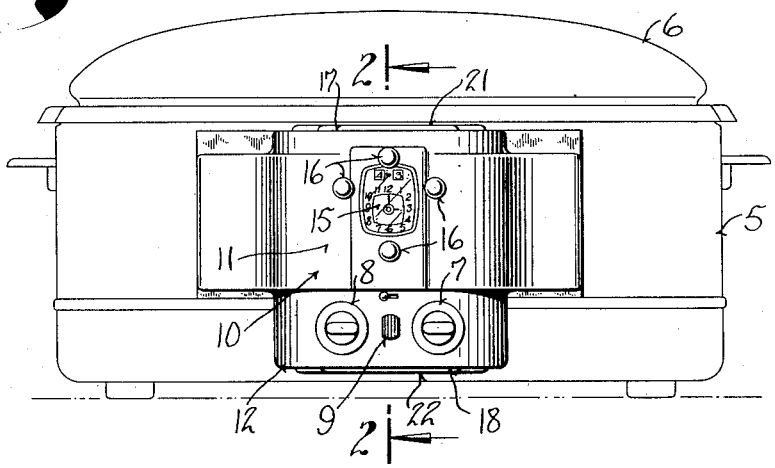
Figure 1 is a front view of an electric roaster embodying this invention.
Figure 2:
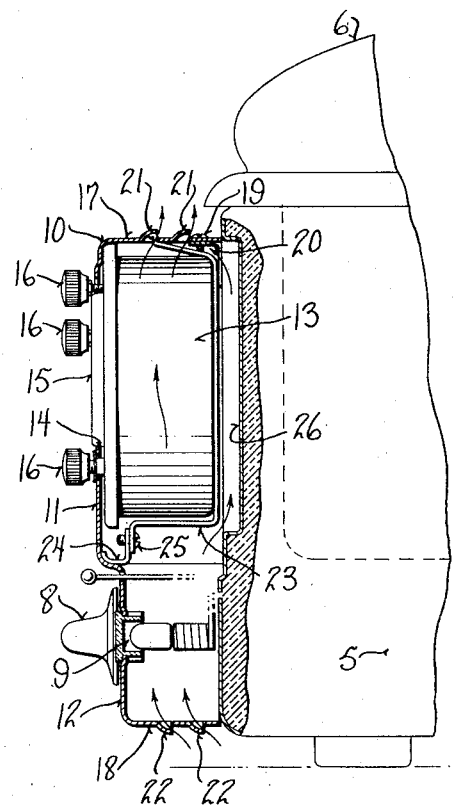
Figure 2 is an enlarged cross sectional view taken through Figure 1 on the plane of the line 2—2.

Referring now more particularly to the accompanying drawing, in which like numerals indicate like parts, the numeral 5 designates the body or receptacle of an electric roaster which, as is customary, has its open top closed by a cover 6. In the present instance the cover is of the hinged type and is adapted to be swung open and closed by actuation of a control knob 7 through mechanism not shown nor forming part of this invention.

The receptacle 5 has electric heating elements (not shown) embedded in its walls, particularly the bottom wall, and all of its walls are insulated to an extent consistent with practical limitations such as weight and overall size. As a consequence, the walls of the receptacle, although substantially insulated, become relatively hot during operation of the roaster.

Heretofore electric roasters were merely equipped with a switch to turn the current on and off, and possibly with a thermostatic control to maintain a predetermined temperature. In the present instance the on and off and heat control switch is actuated by a knob 8 similar to the knob 7 and arranged opposite thereto for the sake of appearance. Between the knobs 7 and 8 is a pilot light 9 to indicate when the roaster is in operation.

The use of timers on electric ranges to turn the oven on and off at predetermined times is quite common and in some instances the clock used for controlling the range could also be employed to turn on and off an electric roaster or other appliance; but heretofore no timer mechanism was incorporated in the roaster as a part thereof.

One of the primary reasons for this was the fact that the timer, and particularly the clock mechanism, could not successfully withstand the heat adjacent to the walls of the roaster upon which such timer mechanism would have to be mounted.

The present invention presents a solution to this problem through the provision of a novel front cover plate 10 which is bulged out to form an upper chamber 11 and a lower smaller chamber 12, the front wall thereof being stepped at the juncture of the two chambers. The sides of the front wall of the upper chamber extend beyond the lower chamber and are curved gracefully to meet the front wall of the receptacle proper.

The front of the cover plate thus has an ornamental function in addition to its utilitarian purpose of enclosing and mounting the timer mechanism which includes a clock 13.

The knobs 7 and 8, and also the indicator or pilot light 9 are mounted on the front wall of the lower enclosure 12. The front wall of the upper enclosure has an opening 14 to accommodate the face 15 of the clock.

The control knobs 16, by which the clock and the control mechanism are adjusted and set, project from the front face of the cover plate above, beneath and at opposite sides of the clock face to give the tout ensemble a neat appearance.

The front wall of the cover plate merges into top and bottom walls 17 and 18, respectively, which extend back to the wall of the receptacle, and to removably mount the cover plate screws 19 pass through the top wall and are threaded into brackets 20 fixed to the front wall of the receptacle. These top and bottom walls 17 and 18 of the front cover unit have vents 21 and 22, respectively, to enable the free flow of cooling air upwardly through the enclosure defined by the cover plate. Heat is thus carried away from the enclosure.

Attention is particularly directed to the manner in which the clock 13 is mounted to have the cooling air flow around and between it and the adjacent hot receptacle wall.

To this end, a mounting strap 23, to which the clock is secured, has one end hooked into one of the vents 21 in the top wall and extends down around the back of the clock to project forwardly where it is secured to a bracket 24 by a screw 25. The portion of the receptacle wall directly adjacent to the clock is preferably recessed as at 26 to increase the air space without entailing too great a projection from the front of the roaster.

From the foregoing description, taken in connection with the accompanying drawing, it will be readily apparent that this invention provides an exceedingly simple but effective manner of equipping an electric roaster with a timer control mechanism and that longevity of the control is assured by preventing excessive heating of the control mechanism, even though it is mounted directly on one of the hot walls of the roaster receptacle.

What we claim as our invention is:

1. In an electric cooking appliance of the character described: a receptacle having an upright front outer wall which becomes hot during operation of the appliance; an ornamental cover plate for said front wall having its medial portion bulged outwardly away from the body of the appliance and the plane of said wall, said cover plate bulged portion defining an enclosure having superimposed top and bottom walls each provided with an air vent so that cooling air may flow in a substantially straight vertical line through said enclosure to carry off heat from the interior thereof; circuit controlling clock mechanism for the cooking appliance disposed within said bulged portion and having its face exposed through said cover plate; and means mounting the clock mechanism on the interior of said enclosure in spaced relation to the adjacent outer wall of the receptacle.

2. In an electric roaster: a receptacle having a front wall which becomes hot during use of the roaster; an ornamental front cover plate for a portion of the exterior of said wall having a medial portion bulged outwardly away from the body of the roaster and the plane of said front wall, said cover plate defining an enclosure and having top and bottom walls each provided with a vent so that ventilating air may rise substantially vertically through the enclosure to carry off heat therefrom; a timer for the roaster including a clock mechanism having a face exposed through an opening in the bulged portion of the front cover plate; and means securing the clock mechanism to the inside of the cover plate in position to have cooling ventilating air flow around it and between it and the hot front wall of the roaster.

HERBERT J. MOON.
EMMET G. GARDNER.